United States Patent [19]
Snodgrass

[11] Patent Number: 4,962,964
[45] Date of Patent: Oct. 16, 1990

[54] FLEXIBLE PLASTIC SEATING SHELL

[76] Inventor: Warren Snodgrass, 223 Woodland Rd., Kentfield, Calif. 94904

[21] Appl. No.: 266,523

[22] Filed: Nov. 3, 1988

[51] Int. Cl.$^5$ .......................... A47C 5/12; A47C 3/12
[52] U.S. Cl. .................................. 297/457; 297/459; 297/DIG. 2; 297/460
[58] Field of Search .............. 297/452, 453, 457, 458, 297/459, DIG. 2

[56]  References Cited
U.S. PATENT DOCUMENTS

| | | | |
|---|---|---|---|
| 3,159,428 | 12/1964 | Schier | 297/452 |
| 3,173,723 | 3/1965 | Hoven et al. | 297/451 |
| 4,036,526 | 7/1977 | Baechle et al. | 297/452 |
| 4,202,581 | 5/1980 | Fleishman | 297/440 |
| 4,502,731 | 3/1985 | Snider | 297/452 |
| 4,647,109 | 3/1987 | Christophersen et al. | 297/458 X |
| 4,660,887 | 4/1987 | Fleming et al. | 297/445 |
| 4,776,633 | 10/1988 | Knoblock et al. | 297/457 X |

FOREIGN PATENT DOCUMENTS

| | | |
|---|---|---|
| 2117153 | 4/1971 | Fed. Rep. of Germany . |
| 2314692 | 1/1977 | France . |
| 2039732 | 8/1980 | United Kingdom . |

Primary Examiner—Peter R. Brown
Attorney, Agent, or Firm—Mason, Fenwick & Lawrence

[57]  ABSTRACT

A seating shell comprises a seat having a plurality of arcuate slots formed therethrough to define a plurality of closely spaced webs extending and suspended between semi-rigid side borders of the seat. The widths of a substantial number of the webs, from front to back, progressively decrease to provide varied degrees of flex and a gradual transition of such flex when a seating load is imposed on the seat. The seating shell may have a backrest integrally formed with the seat. The backrest also has a plurality of webs formed thereon to provide a flexible back support.

16 Claims, 3 Drawing Sheets

FLEXIBLE PLASTIC SEATING SHELL

This invention relates to a seating shell and more particularly to a seat having a plurality of flexible webs formed thereon to provide a comfortable suspension system for the user.

BACKGROUND OF THE INVENTION

Manufacturers of outdoor and indoor seating arrangements have continually endeavored to provide for the comfort of the user. In particular, it is desirable to provide a "soft" suspension system when a seating load is imposed on a seat, while yet maintaining the seat's structural integrity. The desirability for providing a comfortable seat suspension is particularly apparent in respect to one-piece seating shells for conventional shell chairs, molded from a semi-rigid plastic material. In addition to comfort, the designer and manufacturer must also consider the chair's aesthetic appearance, its slimness of profile, particularly for upholstered chairs, and its ventilation capabilities.

Heretofore, various attempts have been made to design a seating shell providing the above desiderata, as exemplified by U.S. Pat. Nos. 4,202,581; 4,502731; and 4,660,887. These patents disclose upholstered and unupholstered seating shells wherein a plurality of slots are formed therein in attempts to more closely conform the seats thereof to the profile of a person sitting thereon. However, seating shells of this type exhibit flexing capabilities that do not provide a highly comfortable suspension system when a seating load imposed thereon. In particular, applicant has found that the ultimate "soft" suspension system for a seating load is one that will provide varied and closely controlled degrees of flex to compensate for the non-uniform seating load imposed thereon, i.e., to provide for a substantially uniform distribution of the seating load over a seat.

SUMMARY OF THE INVENTION

An object to this invention is to provide a comfortable seating shell exhibiting a high degree of structural integrity. In addition, the seating shell is a aesthetically pleasing, provides a high degree of ventilation capabilities and is adapted for use in either upholstered or unupholstered seating arrangements, such as chairs.

The seating shell comprises a seat having solid, semi-rigid and laterally spaced side borders and front and back borders extending transversely between the side borders to form a frame structure. A plurality of arcuate slots are formed through the seat to define a plurality of closely spaced and flexible webs having their lengths extending and attached in suspended relationship between the side borders of the seat.

In one aspect of this invention, at least a substantial number of the webs have varied widths for providing varied degrees of flex and a substantially uniform distribution of a seating load when it is imposed on the seat.

In another aspect of this invention, the widths of a substantial number of the webs progressively decrease from a first web, next adjacent to the front border of the seat, toward the back border of the seat to aid in a gradual transition of the seat's flexing capabilities when the seating load is imposed thereon.

In another aspect of this invention, the slots defining the webs each has an arc of curvature that is concave when viewed from the front border of the seat to aid in the smooth transitional and uniform distribution of the seating load on the seat.

In another aspect of this invention, a substantial number of the arcuate slots are defined by radii of circles which become progressively shorter in a direction from the front border towards the back border of the seat to provide an additional design parameter relating to the "softness" accorded to the seat.

In another aspect of this invention, the seating shell further includes a backrest integrally formed with the seat and a plurality of second slots formed through the backrest to define a plurality of closely spaced and flexible second webs for providing a flexible back support thereat.

The slots formed in both the seat and backrest provide enhanced air ventilation to expel body heat.

BRIEF DESCRIPTION OF THE DRAWINGS

Other objects and advantages of this invention will become apparent from the following description and accompanying drawings wherein.

DESCRIPTION OF THE PREFERRED EMBODIMENT

Figure 1:
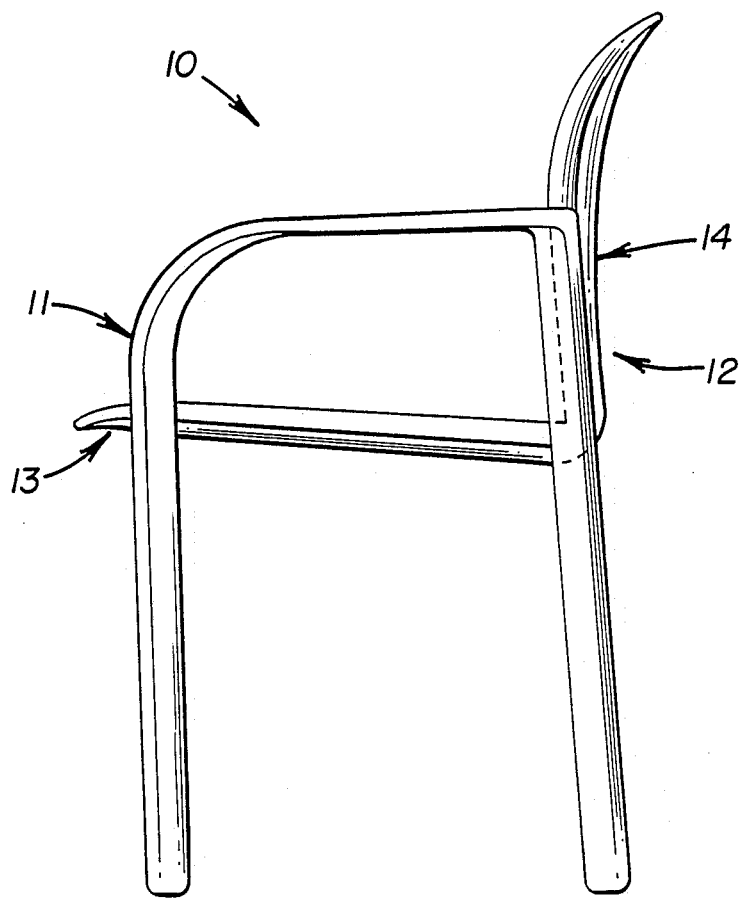
FIG. 1 is a partially sectioned side elevational view of a chair having a seating shell of this invention secured on a frame thereof with the opposite side of the chair being a image of the side shown.
Figure 2:
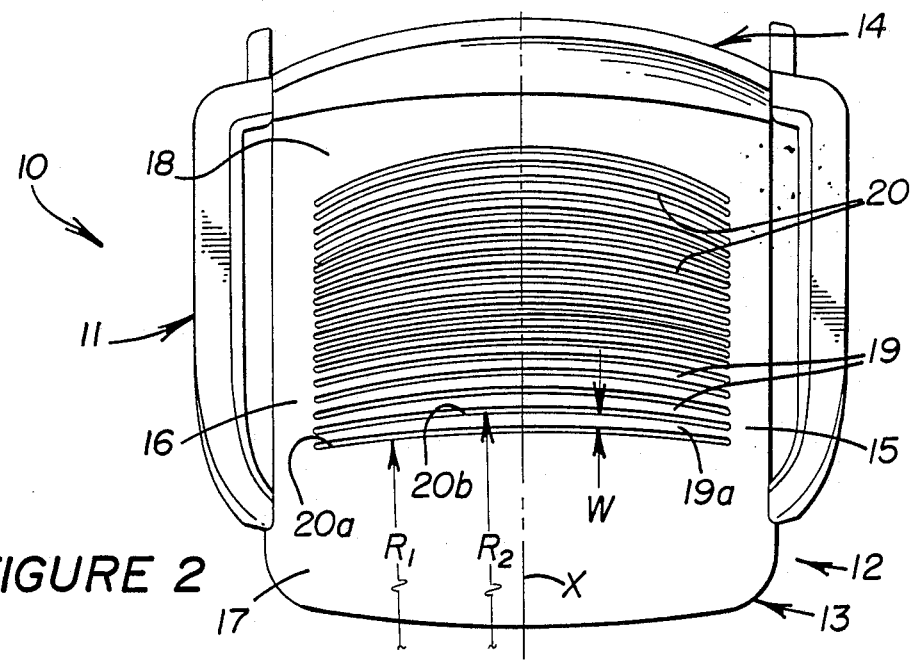
FIG. 2 is a top plan view of the chair.
Figure 3:
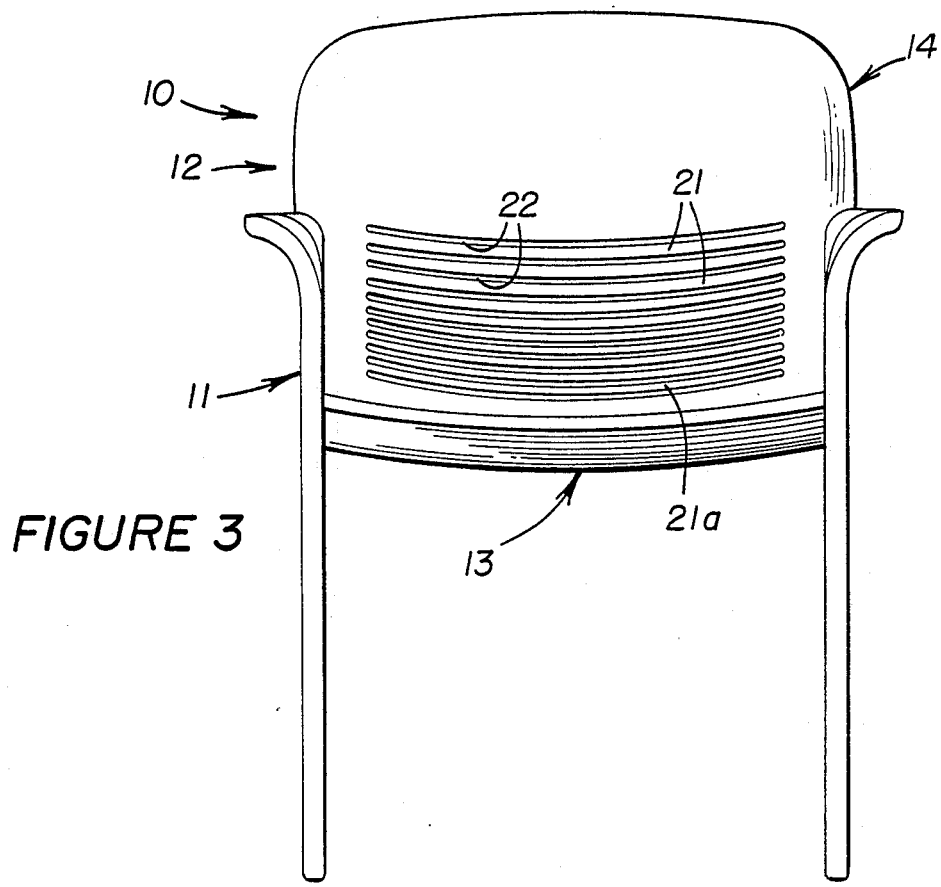
FIG. 3 is a front elevational view of the chair.

FIGS. 1-3 illustrate a chair 10 comprising a frame 11 having a seating shell 12 secured thereon in a conventional manner. As described more fully hereinafter, the seating shell is preferably molded as a one-piece construction and is composed of a standard plastic material, such as fiberglass, polypropylene, nylon or polyester resin. The seating shell comprises a generally horizontally disposed seat 13 and an upstanding backrest 14, formed integrally at the rear of the seat. The seat and backrest may also be molded as separate units, particularly for upholstered furniture.

Although the seating shell is particularly adapted for use in a chair, the seating shell can likewise be used in other seating arrangements, such as couches and loveseats, with or without backrest 14. For example, a seat 13 (without the use of backrest 14) could be used as a seating arrangement on bleecher-type supports, commonly found in sports stadiums, at bus stops and the like. Further, although the seating shell has particular application to unupholstered "shell" chairs used as outdoor patio furniture or used indoors, the seating shell could be upholstered for use either outdoors or indoors.

Referring to FIG. 2, seat 13 is disposed on a central longitudinal axis X thereof and comprises solid, semi-rigid and laterally spaced side borders 15 and 16 extending in the direction of the axis. Front and back borders 17 and 18, respectively, extend transversely between the side borders to form a supporting frame structure for a plurality of closely spaced and flexible webs 19 suspended therefrom. The webs are defined by a plurality of arcuate slots 20 formed through the seat and having their ends attached between side borders 15 and 16.

Figure 4:
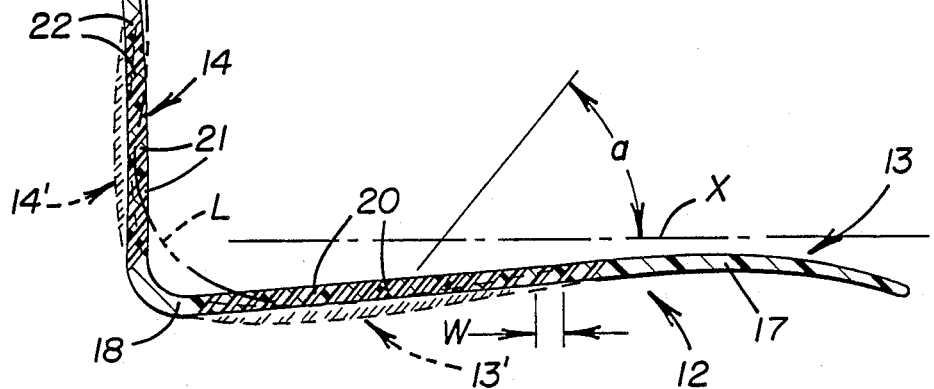
FIG. 4 is an enlarged longitudinal cross-sectional view through the seating shell.

As further shown in FIGS. 2 and 4, at least a substantial number of the webs have varied widths W to provide preselected and varied degrees of flex and a substantially uniform distribution of a seating load L (FIG. 4) when such load is imposed on the seat by a person. In the embodiment illustrated, the webs have widths that progressively decrease from a first web 19a, next adjacent to front border 17, through the next following eleven webs towards border 18 to provide a gradual transition of the flex when load L is imposed on the seat. The thirteenth web has the same width as the twelfth web and the next following six webs have width that progressively increase.

Each of the slots has an arc of curvature that is concave, when viewed from front border 17 of the seat. Each slot preferably defines an arc of a circle with the arc defining a first slot 20a having a radius $R_1$ originating at a center (not shown) positioned on an extension of axis X, disposed forwardly of seat 13. The arc of the circle defining a next adjacent second slot 20b has a radius $R_2$ that is shorter than radius $R_1$. The radii defining the remaining slots become progressively shorter, towards back border 18 of the seat. This feature aids the designer in providing varied degrees of flex in the seat: and, in particular, to progressively increase such flexibility from front to back on the seat, i.e., the shorter the radius, the greater the flex.

This "varied radii" design parameter coupled with the preselected variance in the widths of webs 19, can be used to tailor the flexibility characteristics desired for a particular seat design. Additional design parameters a designer would consider include the sizes and lengths of slots 20, the sizes and lengths of webs 19, the particular material composing the webs and related parameters well known to those skilled in the art.

Figure 5:
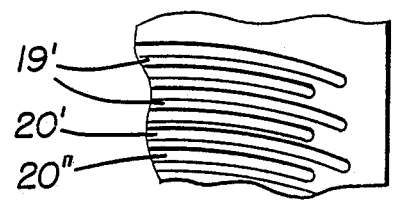
FIG. 5 is a top plan view partially illustrating a modified seating shell.

The chords of webs 19 may be the same, as shown in FIG. 2, or may vary, as shown in FIG. 5. In FIG. 5, the lengths of a first set of slots 20' are longer than the lengths of a second set of slots 20", with the slots being staggered at each end thereof. In the illustrated modification, slot 20" is disposed between a pair of slots 20' and vice versa. Thus, the ends of the adjacent slots and webs 19' are staggered to increase the structural rigidity of the seat thereat by preventing undue stress risers at the corners of the webs.

Referring to FIGS. 1 and 3, backrest 14 is secured in upstanding relationship at the back border of seat 13 and has a plurality of closely spaced flexible webs 21 suspended thereacross to provide a flexible and ventilated back support for the chair. The webs are defined by a plurality of slots 22, formed through the backrest in a reverse manner in respect to slots 20 of the seat. In particular, at least a substantial number of webs 21 have widths that progressively decrease from a first web 21a, next adjacent to the juncture of the backrest with the seat, towards the top of the backrest. The webs and slots are otherwise configured and designed in accordance with the design criteria and parameters described above. It should be further noted that the arcs defining slots 22 are convex and that their radii progressively increase, when viewed from the seat towards the top of the backrest.

Referring to FIG. 4, slots 20 are each disposed at an acute angle "a", relative to a horizontal plane containing longitudinal axis X of the seat. Such angle is preferably selected from the approximate range of from 30° to 60° and each slot extends downwardly through the seat and rearwardly towards back border 18 thereof. This collective inclined disposition of the slots aids in the smooth reception and suspended support of seating load L imposed thereon and is depicted by depression of seat 13 to its phantom-line position 13'. It should be noted that webs 19 and slots 20 are constructed and disposed to prevent any interference or interlocking between the webs when the seat is depressed. FIG. 4 further depicts depression of backrest 14 to its 14' position, when it supports the lumbar region of a person sitting in the seating shell.

Figure 6:
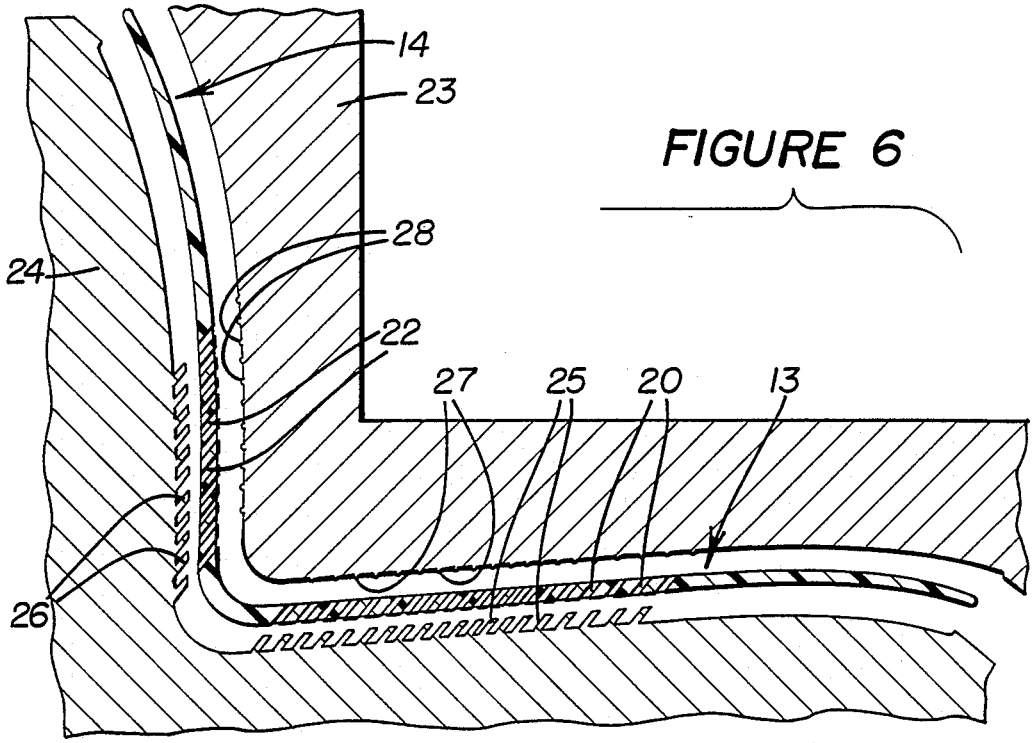
FIG. 6 is a view similar to FIG. 5, but further partially illustrates a two-part injection mold for making the seating shell.

FIG. 6 partially illustrates a two-part steel mold 23, 24 adapted to form seating shell 12. Mold part 24 has a plurality of arcuate first ribs 25 and 26 secured on a frontal surface thereof that conform to arcuate slots 20 and 22, respectively. The ribs terminate short of the outer surface of the seating shell to accommodate shorter and aligned arcuate second ribs 27 and 28, secured on a frontal surface of mating mold part 23. Thus, the parting line between the ribs will occur within the slots to enhance the aesthetic appearance at the outer surface of the seating shell. The liquid plastic molding material can be injected into the defined mold cavity and allowed to solidify in a conventional manner.

One commercial embodiment of seating shell 10 was dimensioned, as follows (FIGS. 2 and 4):
Width of seat 13=18.0 in.
Depth of seat 13=17.5 in.
Number of slots 20=Twenty (on axis X, FIG. 2)
Chord of each slot 20=15.0 in.
Radius $R_1$ of first slot 20a=40.0 in.
Radii $R_2$ of second slot 20b through the fifth slot= Progressively reduced by 4.0 in. (36.0 in. - 24.0 in.)
Radii of sixth through eighth slot=Progressively reduced by 2.0 in. (22.0 in. - 18.0 in.)
Radii of ninth through twentieth slot=18.0 in.
Overall depth of twenty slots=9.5 in. (on axis X).
Width of each slot=0.125 in.
Thickness of seating shell 12 and webs 19 (and approximate depth of each slot 20)=0.1875 in.
Number of webs 19=nineteen
Widths of webs 19=Width of first web 19a equals 0.5 in.; widths of next following eleven webs progressively decrease to 0.1875 in. width of twelfth web, the width of the thirteenth web is the same as the twelfth web, and the next following six webs increase to 0.375 in. width of nineteenth (last) web.
Depth of front border 17=8.875 in. (on axis X).
Depth of back border 18=1.875 in. (on axis X).
Widths of side borders 15 and 16=1.5 in.

I claim:

1. A seating shell comprising:
a seat, disposed on a central longitudinal axis thereof, having solid, semi-rigid and laterally spaced side borders extending in the direction of said axis and front and back borders extending transversely between said side borders to form a frame structure for said seat;
a plurality of elongated closely spaced arcuate slots, said slots having their lengths extending between and terminating at said side borders and being formed through said seat to define a plurality of closely spaced and flexible web means, each of said slots defining an arc of curvature that is concave when viewed from the front border of said seat, and each of said slots extending downwardly and rearwardly towards the back border of said seat at an acute angle, relative to a horizontal plane containing said axis, selected from the approximate range of from 30° to 60°; and said web means having their lengths extending and attached in suspended relationship between said side borders, with at least a substantial number of said web means having varied widths for providing varied degrees of flex and a substantially uniform distribution of a seating load when such load is imposed on said seat.

2. The seating shell of claim 1 wherein each of said slots defines an arc of a circle.

3. The seating shell of claim 2 wherein a radius defining said circle has its center positioned on an extension of said axis, disposed forwardly of said seat.

4. The seating shell of claim 3 wherein said radius is selected from the approximate range of from 18.0 in. to 30.0 in.

5. The seating shell of claim 2 wherein the radii of at least a selected number of said circles vary relative to each other.

6. The seating shell of claim 1 wherein the lengths of said slots are the same.

7. The seating arrangement of claim 1 wherein said plurality of slots is divided into first and second slots, wherein the lengths of said first set of slots are longer than the lengths of said second sets of slots.

8. The seating arrangement of claim 7 wherein each slot of at least most of said second set of slots is disposed between a pair of slots of said first set of slots.

9. The seating shell of claim 1 wherein the width said seat between outer boundaries of said side borders approximates from 15.0 in. to 24.0 in., the depth of said seat between outer boundaries of said front and back borders approximates from 14.0 in. to 22.0 in., the length of each of said web means approximates from 13.0 in. to 22.0 in., and the width of each of said side borders approximating from 0.5 in. to 2.0 in.

10. The seating shell of claim 9 wherein the width of each of said web means is selected from the approximate range of from 0.1 in. 0.3 in. and the thickness of each of said web means is selected from the approximate range of from 0.05 in. to 0.2 in.

11. The seating shell of claim 1 further comprising a backrest secured in upstanding relationship at the back border of said seat and further comprising a plurality of second slots formed through said backrest to define a plurality of closely spaced flexible second web means for providing a flexible back support thereat.

12. The seating shell of claim 1 wherein said seat is composed of materials selected from the group consisting of fiberglass, polypropylene, nylon and polyester resin.

13. A seating shell comprising:
a seat, disposed on a central longitudinal axis thereof, having solid, semi-rigid and laterally spaced side borders extending in the direction of said axis and front and back borders extending transversely between said side borders to form a frame structure for said seat;

a plurality of arcuate slots formed through said seat to define a plurality of closely spaced and flexible web means, having their lengths extending and attached in suspended relationship between said side borders, with at least a substantial number of said web means having varied widths for providing varied degrees of flex and a substantially uniform distribution of a seating load when such load is imposed on said seat; and said substantial number of said web means have widths that progressively decrease from a first web means adjacent to said front border, towards said back border for providing a gradual transition of said flex when said seating load is imposed on said seat.

14. A seating shell comprising:
a seat, disposed on a central longitudinal axis thereof, having solid, semi-rigid and laterally spaced side borders extending in the direction of said axis and front and back borders extending transversely between said side borders to form a frame structure for said seat;

a plurality of arcuate slots formed through said seat to define a plurality of closely spaced and flexible web means, each of said slots defining an arc of a circle wherein a radius defining the circle has its center positioned on an extension of said axis disposed forwardly of said seat;

each of said web means having their lengths extending and attached in suspended relationship between said side borders, with at least a substantial number of said web means having varied widths for providing varied degrees of flex and a substantially uniform distribution of a seating load when such load is imposed on said seat; and wherein the radii of a selected number of said circles vary relative to each other by becoming progressively shorter from said first web means towards the back border of said seat.

15. A one-piece plastic seating shell comprising:
a seat, disposed on a central longitudinal axis thereof, having solid, semi-rigid and laterally spaced side borders extending in the direction of said axis and front and back borders extending transversely between said side borders to form a frame structure for said seat;

a plurality of arcuate slots formed through said seat to define a plurality of closely spaced web means, having their lengths extending and attached between said side borders, for providing varied degrees of flex and a substantially uniform distribution of a seating load when such load is imposed on said seat, wherein each of said slots defines an arc of curvature that is concave when viewed from the front border of said seat; and wherein a substantial number of said web means have widths that progressively decrease from a first web means, adjacent to said front border, towards said back border for providing a gradual transition of said flex when said seating load is imposed on said seat.

16. A one-piece plastic seating shell comprising:
a seat, disposed on a central longitudinal axis thereof, having solid semi-rigid and laterally spaced side borders extending in the direction of said axis and front and back borders extending transversely between said side borders to form a frame structure for said seat; and a plurality of arcuate slots formed through said seat to define a plurality of closely spaced web means, having their lengths extending and attached between said side borders, for providing varied degrees of flex and a substantially uniform distribution of a seating load when such load is imposed on said seat, wherein each of said slots defines an arc of curvature that is concave when viewed from the front border of said seat, and each of said slots defines an arc of a circle subscribed by a radius having its center positioned on an extension of said axis, disposed forwardly of said seat, and wherein the radii of at least a substantial number of said circles become progressively shorter from said first web means towards the back border of said seat.

* * * * *